US009636971B2

(12) United States Patent
Jaisimha et al.

(10) Patent No.: US 9,636,971 B2
(45) Date of Patent: *May 2, 2017

(54) METHOD FOR DRIVE PERSONALIZATION BASED ON TUNNEL DETECTION FOR A SINGLE-TUNER SYSTEM

(71) Applicant: Panasonic Automotive Systems Company of America, Division of Panasonic Corporation of North America, Peachtree City, GA (US)

(72) Inventors: Shree Jaisimha, Senoia, GA (US); Mohammed Reza Kanji, Brampton (CA); Tatsuya Fujisawa, Newnan, GA (US); Roopa Chandrashekar, Dunwoody, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/595,799

(22) Filed: Jan. 13, 2015

(65) Prior Publication Data

US 2015/0127218 A1    May 7, 2015

Related U.S. Application Data

(63) Continuation of application No. 12/322,245, filed on Jan. 30, 2009, now Pat. No. 8,957,769.

(51) Int. Cl.
*B60Q 1/00* (2006.01)
*G08G 1/123* (2006.01)
(Continued)

(52) U.S. Cl.
CPC ..... *B60H 1/00964* (2013.01); *B60H 1/00771* (2013.01); *B60H 1/00849* (2013.01);
(Continued)

(58) Field of Classification Search
CPC ............ B60H 1/00771; B60H 1/00849; B60H 1/00964; B60J 1/12; B60Q 1/04; B60Q 1/143; B60Q 2300/337; B60Q 3/048
(Continued)

(56) References Cited

U.S. PATENT DOCUMENTS

| 2001/0007967 A1* | 7/2001 | Yamamoto | B60H 1/00771 701/409 |
| 2005/0157509 A1* | 7/2005 | Tsukamoto | B60Q 1/1423 362/465 |
| 2008/0262722 A1* | 10/2008 | Haag | B60H 1/00771 701/412 |

FOREIGN PATENT DOCUMENTS

DE    10151796 A1    6/2003
EP    0724136 A1    7/1996
(Continued)

OTHER PUBLICATIONS

Supplementary European Search Report, Jan. 20, 2015, pp. 1-8, Munich, Germany.

*Primary Examiner* — Emily C Terrell
(74) *Attorney, Agent, or Firm* — Laurence S. Roach, Esq.

(57) ABSTRACT

A method of operating a vehicle includes receiving a radio frequency signal and determining that the radio frequency signal has at least one characteristic indicative of the vehicle entering a tunnel. A setting of a vehicle system is automatically modified in response to the determining step.

20 Claims, 7 Drawing Sheets

(51) Int. Cl.
*G08G 1/00* (2006.01)
*G08B 13/14* (2006.01)
*G08B 21/00* (2006.01)
*B60H 1/00* (2006.01)
*B60Q 1/14* (2006.01)
*B60Q 3/04* (2006.01)
*H04H 60/51* (2008.01)
*H04H 60/65* (2008.01)
*B60J 1/12* (2006.01)
*B60Q 1/04* (2006.01)

(52) U.S. Cl.
CPC *B60J 1/12* (2013.01); *B60Q 1/04* (2013.01); *B60Q 1/143* (2013.01); *B60Q 3/048* (2013.01); *H04H 60/51* (2013.01); *H04H 60/65* (2013.01); *B60Q 2300/337* (2013.01); *B60W 2540/28* (2013.01)

(58) Field of Classification Search
USPC ......... 340/438, 439, 988, 572.1, 686.1, 901; 701/36
See application file for complete search history.

(56) References Cited

FOREIGN PATENT DOCUMENTS

| | | | |
|---|---|---|---|
| EP | 1022189 | A1 | 7/2000 |
| EP | 1043193 | A1 | 10/2000 |
| EP | 1195897 | A2 | 4/2002 |
| JP | 08-268150 | A | 10/1996 |
| JP | 2002-029246 | A | 1/2002 |
| JP | 2004-230934 | A | 8/2004 |

\* cited by examiner

METHOD FOR DRIVE PERSONALIZATION BASED ON TUNNEL DETECTION FOR A SINGLE-TUNER SYSTEM

CROSS-REFERENCE TO RELATED APPLICATION

This application is a continuation of U.S. patent application Ser. No. 12/322,245, filed on Jan. 30, 2009, now U.S. Pat. No. 8,957,769, issued on Feb. 17, 2015, the disclosure of which is hereby incorporated by reference in its entirety for all purposes.

BACKGROUND OF THE INVENTION

1. Field of the Invention

The present invention relates to personalization systems, and, more particularly, to personalization systems for use in vehicles.

2. Description of the Related Art

Driver personalization is a recent trend that has a possibility of impacting the automotive entertainment market. Automotive manufacturers have taken notice of this trend and are beginning to explore ways of differentiating their offerings to the end customer.

Current driver personalization systems use the same preferred settings of the driver without regard to the environment in which the vehicle is disposed. That is, the personalized settings are fixed, and do not vary with the driving environment. Thus, if the vehicle enters an unusual environment, the driver must manually change the vehicle system settings to suit his preferences in that environment, or else suffer with non-preferred settings while the vehicle is in the unusual environment.

Accordingly, what is neither anticipated nor obvious in view of the prior art is a method of detecting when a vehicle has entered an unusual environment, and effecting predetermined settings preferred by the driver while in the unusual environment.

SUMMARY OF THE INVENTION

The present invention may provide a method for the radio head unit to determine when it has entered a tunnel or underground garage by sensing changes in received broadcast radio frequency signals. In response to determining that the vehicle has entered a tunnel, the radio emits a signal within the vehicle that causes the driver's preferences for vehicle system settings while in a tunnel to be put into effect.

The invention may enable the car radio to detect when the vehicle has entered or exited a tunnel and, in response thereto, control driver-specific operations within the vehicle. Such driver-specific or driver-preferred operations may include: automatic illumination control of the instrument cluster on the vehicle dashboard when entering and exiting the tunnel; switching the passenger compartment air circulation as controlled by the HVAC system between accepting outside air and re-circulating the air already in the passenger compartment; turning on headlights if they are not already on upon entry into the tunnel; controlling the maximum speed of the vehicle inside the tunnel; and if the tunnel happens to be a long tunnel or if there is a traffic jam in the tunnel, raising the windows to ensure that polluted air does not get into the vehicle.

In one embodiment, the present invention allows the radio head unit to monitor the received radio frequency signal for specific characteristics on both single tuner and dual tuner radio head units and offer driver specific preference options in case the car detects a tunnel.

Driver personalization inside tunnel can only be made possible if the tunnel detection logic can differentiate between false triggers and accurately determine tunnel detection. The invention proposed here serves to implement this feature and offer new applications that can be offered to the end customer.

The invention comprises, in one form thereof, a method of operating a vehicle, including receiving a radio frequency signal and determining that the radio frequency signal has at least one characteristic indicative of the vehicle entering a tunnel. A setting of a vehicle system is automatically modified in response to the determining step.

The invention comprises, in another form thereof, a method of operating a vehicle, including storing a group of vehicle system settings that are preferred by a driver when the vehicle is in a tunnel. A radio frequency signal is received and it is determined that the radio frequency signal has at least one characteristic indicative of the vehicle entering a tunnel. At least one of the driver-preferred vehicle system settings is automatically implemented in response to the determining step.

The invention comprises, in yet another form thereof, a method of operating a vehicle, including receiving a radio frequency signal and determining that the radio frequency signal has at least one characteristic indicative of the vehicle entering a tunnel. A setting of a vehicle system is automatically changed from a first state to a second state in response to the determining step. After the automatically modifying step, it is ascertained that the radio frequency signal has at least one characteristic indicative of the vehicle exiting the tunnel. The setting of the vehicle system is automatically changed back to the first state in response to the ascertaining step.

An advantage of the present invention is that while a vehicle is in a tunnel, the user's preferences for vehicle system settings while in a tunnel are automatically put into effect.

Another advantage is that the present invention may be applicable to any FM digital tuner system.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
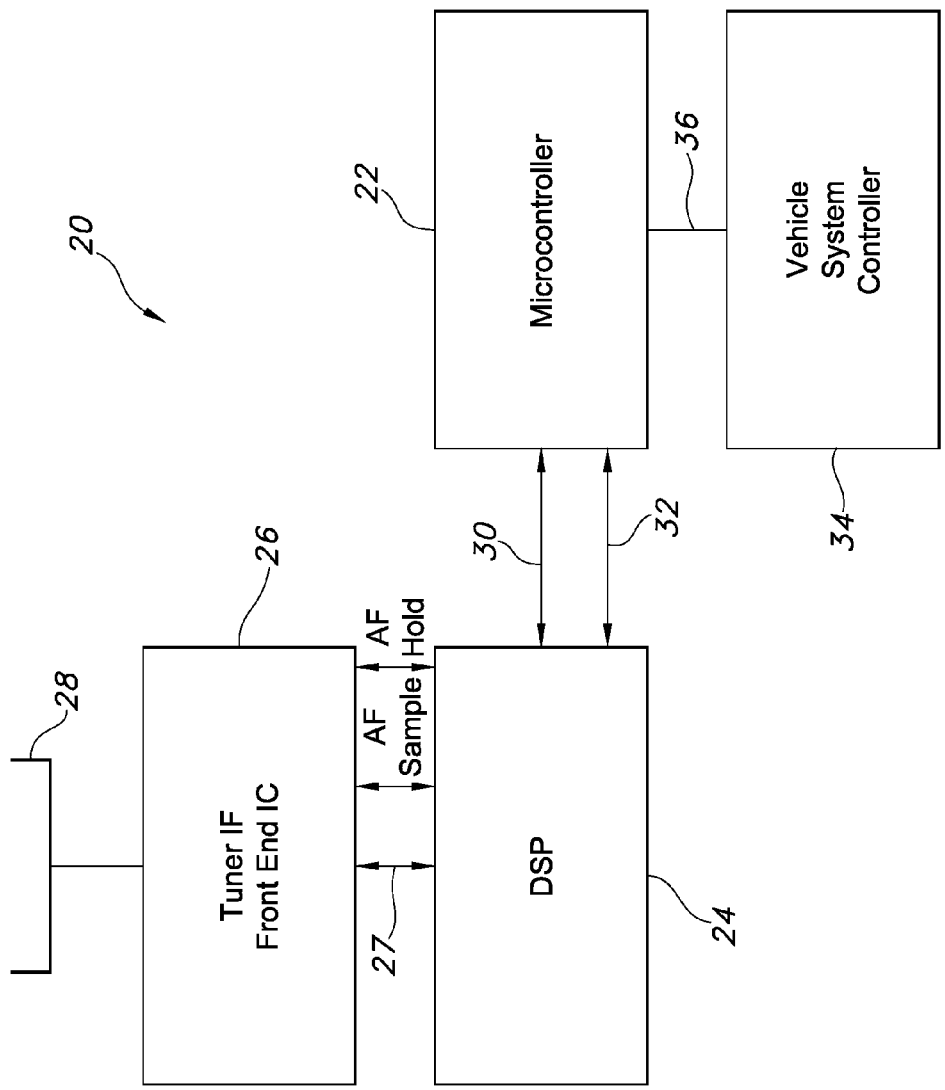
FIG. 1 is a block diagram illustrating one embodiment of a radio system of the present invention.

Referring now to the drawings, and particularly to FIG. 1, there is shown one embodiment of a radio system 20 of the present invention including a microcontroller 22 that may be used to process user input. A digital signal processor (DSP) 24 may be used to provide audio demodulation of the air-borne IF input signal. DSP 24 may also be used to provide quality information parameters to the main microcontroller 22 via a serial communication protocol such as I2C. The quality information parameters may include multipath, adjacent channel noise, and field strength. DSP 24 may rely on a Tuner IC 26 to perform the front end RF demodulation and the gain control. Tuner IC 26 may also output the Intermediate Frequency to DSP 24 where the Intermediate Frequency may be demodulated and processed. Tuner IC 26 may further provide a gain to the IF (Intermediate Frequency) of up to 6 dBuV prior to forwarding the signal to DSP 24. Communication between Tuner IC 26 and DSP 24, as indicated at 27, may be via a serial communication protocol such as I2C, which may operate at 350 kbps.

An antenna system 28 may be communicatively coupled to Tuner IC 26. Antenna system 28 may be in the form of a passive mast, or an active mast of phase diversity, for example.

DSP 24 may provide signal quality parameterization of demodulated tuner audio and may make it available to microcontroller 22 via a serial bus 30. In one embodiment, serial communication bus 30 is in the form of a 350 kbps high speed I2C. A radio data system (RDS) interrupt line 32 may also be provided between DSP 24 and microcontroller 22.

Microcontroller 22 may control the operations and/or settings of a vehicle system controller 34 via a conductor 36. For example, upon determining that the vehicle in which radio system 20 is installed has entered or exited a tunnel, microcontroller 22 may, via vehicle system controller 34, put into effect preloaded driver preferences as to the settings of vehicle systems such as instrument cluster illumination, HVAC air circulation, headlight status, maximum vehicle speed, and/or power windows.

The signal parameterization may include field strength, multipath and ultrasonic noise. Field strength may give an indication of signal reception and may help determine whether the radio station has good signal coverage in the vicinity of the user. This field strength quality parameter may be applicable for FM modulation signal reception.

Although the signal can have high field strength, it can be subject to reflections which can arise from trees and tall building which reflect/deflect the signal. The multipath parameter may enable the level of multipath to be ascertained, and may affect reception quality. The multipath quality parameter may be applicable for FM modulation signal reception.

Many times stations can overmodulate their signal leading to adjacent channel interference. For example, in the U.S., FM frequencies are spaced apart 200 kHz. Adjacent channel interference can lead to ultrasonic noise in cases where a neighboring station that is next to a currently listened-to station has a high field strength. The high field strength may result in the neighbor station's spectrum overlapping with that of the currently listened-to station, thereby causing audio distortion. Ultrasonic noise may typically be detected by the DSP if the DSP detects harmonics past the 150 kHz band after IF demodulation.

The present invention may be utilized in a real time multithreaded environment. A real time embedded system such as a car radio may have many threads running consecutively. The tuner application may run on a tuner thread on microcontroller 22.

In one embodiment, a 100 millisecond cyclic timer is utilized to monitor the radio station that is currently being listened to by the user. Upon each timer expiration, the software may monitor the field strength and multipath levels from DSP 24. The monitoring process may include acquiring the signal parameterization of the frequency with associated field strength and multipath. The raw field strength data may be passed through a low pass filter and analyzed for characteristics that are consistent with the vehicle entering and/or exiting a tunnel.

The signal data characteristics that are consistent with tunnel entry and exit may include high multipath due to signal reflections, and field strength fluctuations. A signal data characteristics that is consistent with tunnel entry is field strength data with a substantially constant negative slope, i.e., field strength steadily decreasing. The signal data characteristic that is consistent with tunnel exit is field strength data with a substantially constant positive slope, i.e., field strength steadily increasing.

Figure 2:
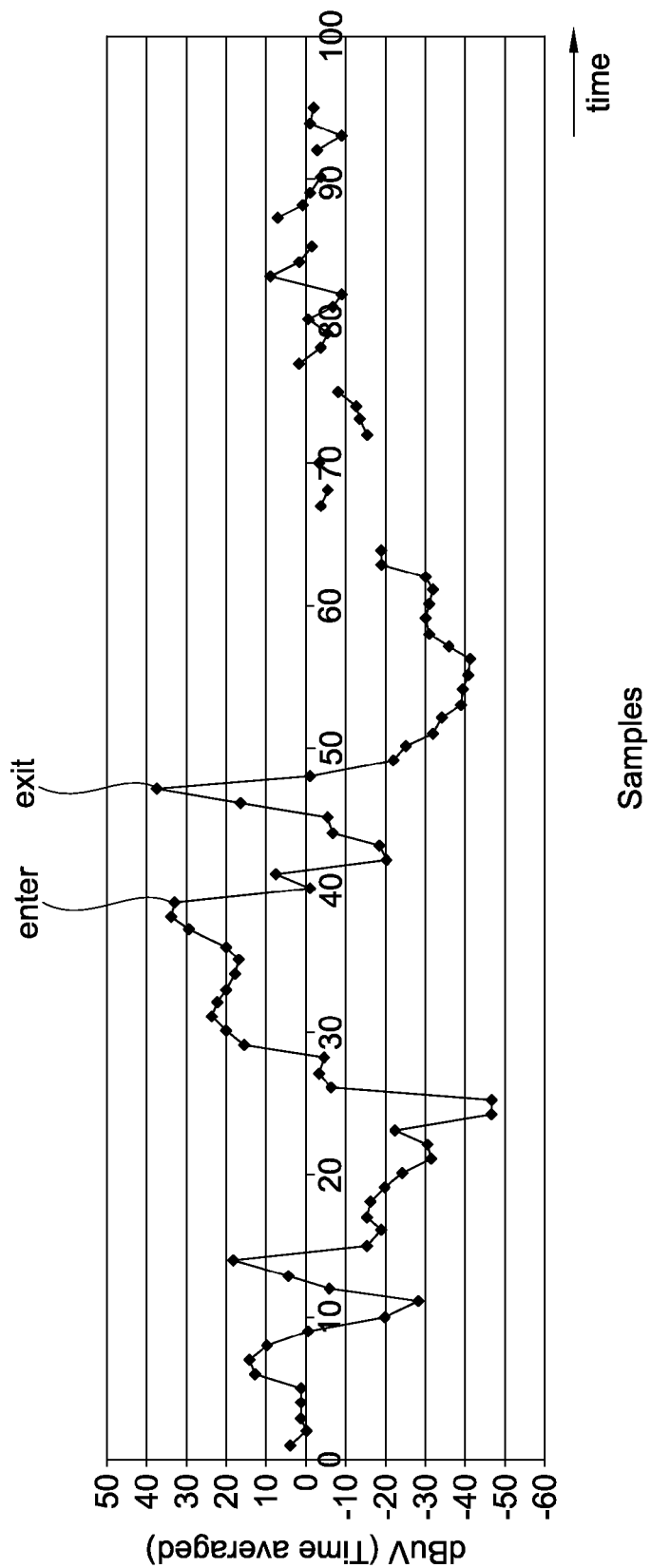
FIG. 2 is an exemplary plot of empirically collected field strength data versus time while a vehicle enters and exits a tunnel.

FIG. 2 is a plot of empirical field strength data collected in the field which was gathered during a test drive through a tunnel. Each dot represents a separate collected data sample. The data points that correspond to tunnel entry and tunnel exit are marked in FIG. 2. Tunnel entry typically corresponds to the field strength having a monotonic negative slope, and tunnel exit typically corresponds to the field strength having a monotonic positive slope.

During operation, and specifically during tunnel entry detection, the field strength may be monitored using samples gathered every 500 milliseconds and stored in a three stage buffer array. The field strength may be checked and stored. The difference between the most current reading and the two immediately previous readings may be expressed in terms of dBuV (decibel microvolts). The slope value may be calibratable. If the data exhibits a monotonically negative slope, then the tunnel detection logic may be triggered.

Assume that $F(2)$ is the most recent field strength value sample, $F(1)$ is a sample taken 500 milliseconds before $F(2)$, and $F(0)$ is a sample taken one second before $F(2)$. Also assume that all samples are sampled at 500 milliseconds. In one embodiment, it is determined that the vehicle is entering a tunnel if $F(2)-F(1)$ is less than x, wherein x is a negative calibratable value, and the absolute value of $F(1)-F(0)$ is greater than the absolute value of x. Similarly, it may be determined that the vehicle is exiting a tunnel if the absolute value of $F(2)-F(1)$ is less than y, wherein y is a positive calibratable value, and the absolute value of $F(1)-F(0)$ is greater than y.

The radio frequency signal characteristics that typically occur when entering and/or exiting a tunnel, i.e., high multipath, high field strength fluctuations, and field strength with a consistently negative or consistently positive slope when plotted versus time, may also possibly occur in cases where there is no tunnel. In mountain areas that have canyons there is a lot of multipath activity causing constant field strength fluctuations which may cause false triggers.

The present invention may differentiate between false triggers and authentic tunnel identifications. False triggers could otherwise occur in cases where the vehicle is traveling in high multipath areas, which in turn may cause drastic changes in field strength and lead to false tunnel detection. Tunnel entry typically is associated with a drop in field strength that is related to high multipath activity upon entering the tunnel.

Figure 3:
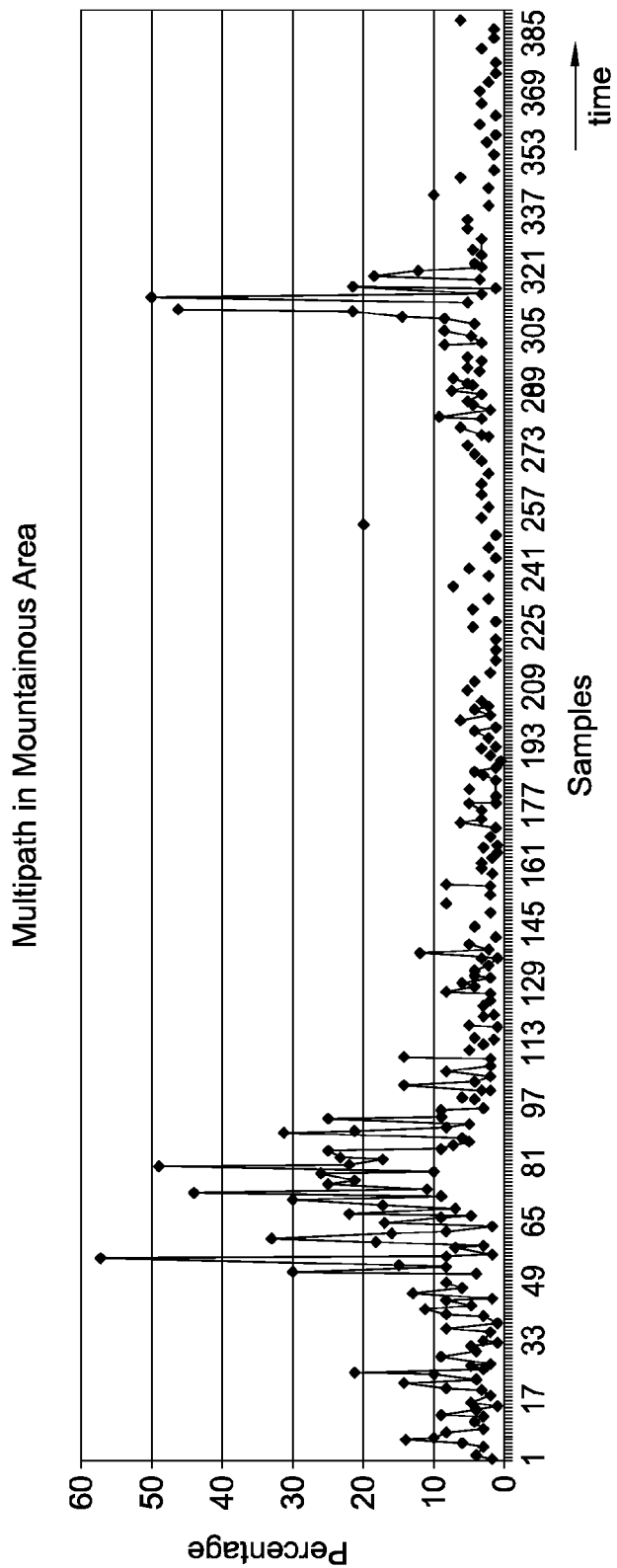
FIG. 3 is an exemplary plot of empirically collected multipath data versus time in a mountainous area expressed as a percentage of the directly-received signal.
Figure 4:
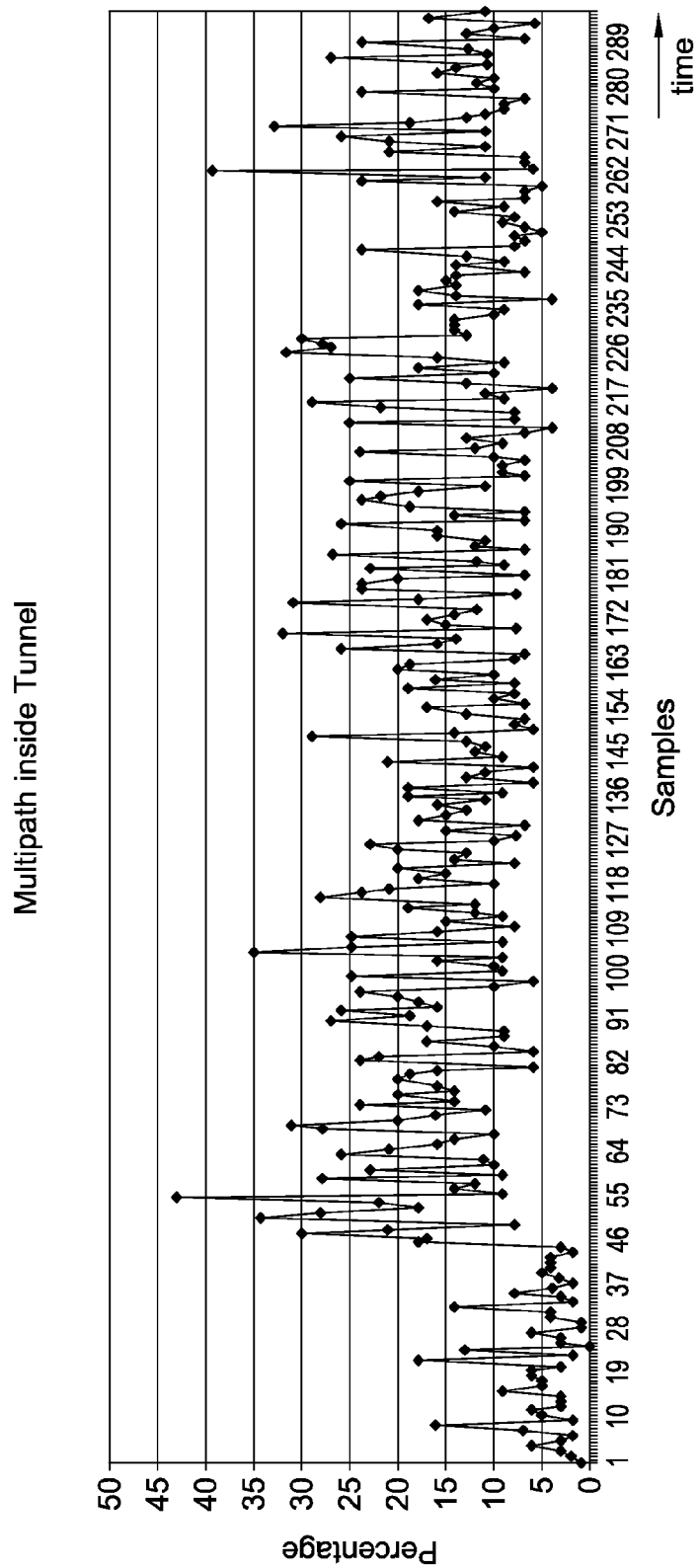
FIG. 4 is an exemplary plot of empirically collected multipath data versus time in a tunnel expressed as a percentage of the directly-received signal.

FIG. 3 is a plot of empirically collected multipath activity data due to a false trigger scenario caused by mountains. FIG. 4 is a plot of empirically collected multipath activity data inside a tunnel. When FIGS. 3 and 4 are compared, it can be observed that multipath due to a false trigger scenario may be characterized by a random signal with bursts of multipath activity. In contrast, multipath due to a tunnel scenario may be characterized by a signal that looks like a "standing wave" inside a waveguide. That is, multipath due to a tunnel scenario may be characterized by consistently higher amplitude and a smaller ratio between the maximum signal value and the minimum signal value. In order for the software to recognize this effect, an autocorrelation operation may be performed on recently sampled data. In one embodiment, the autocorrelation operation is performed on a history of 200 samples. The 200 samples translates to two seconds of data given that the sampling rate is one sample at every 10 millisecond interval.

Figure 5:
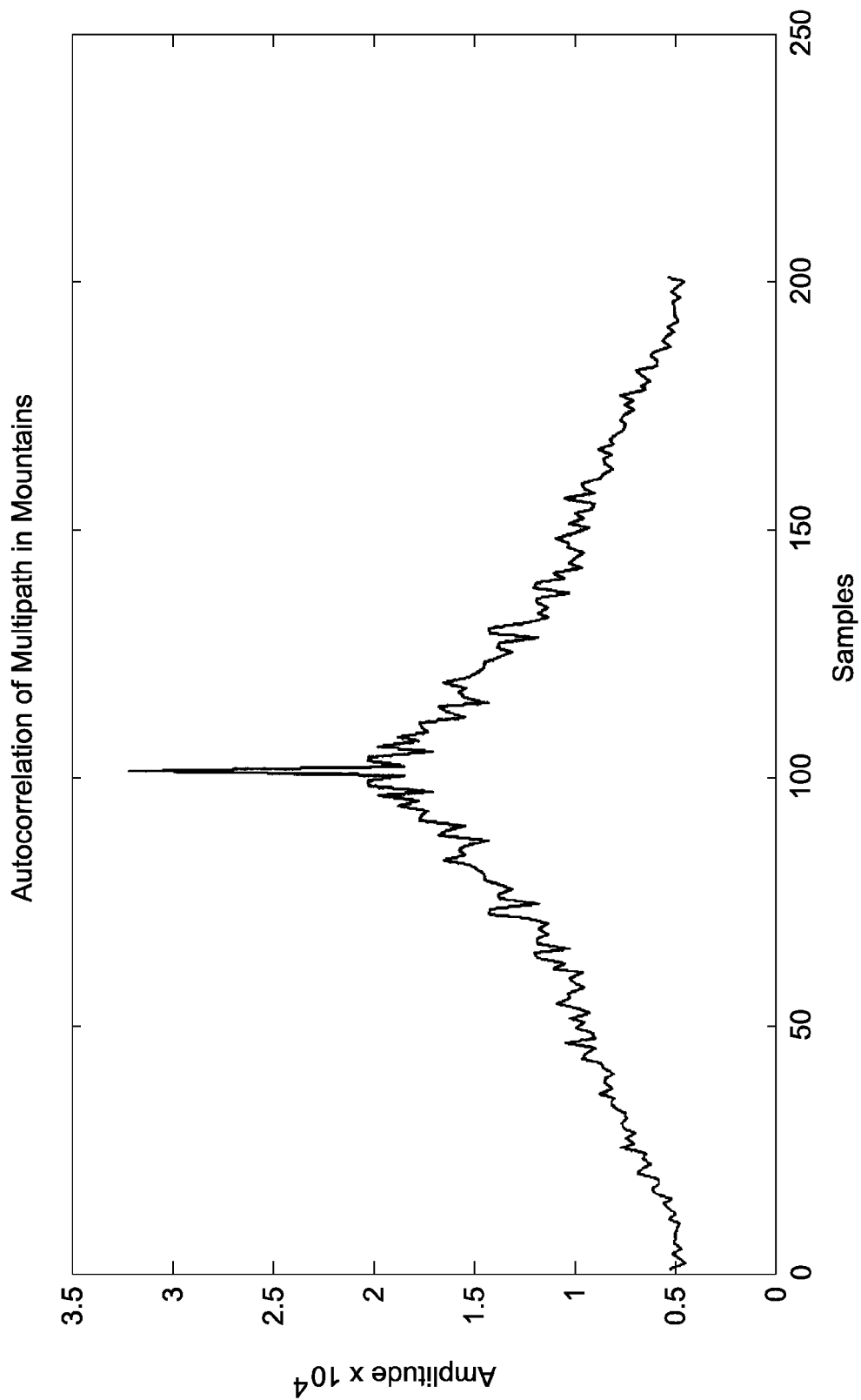
FIG. 5 is an exemplary plot of autocorrelation of multipath data empirically collected in a mountainous area.
Figure 6:
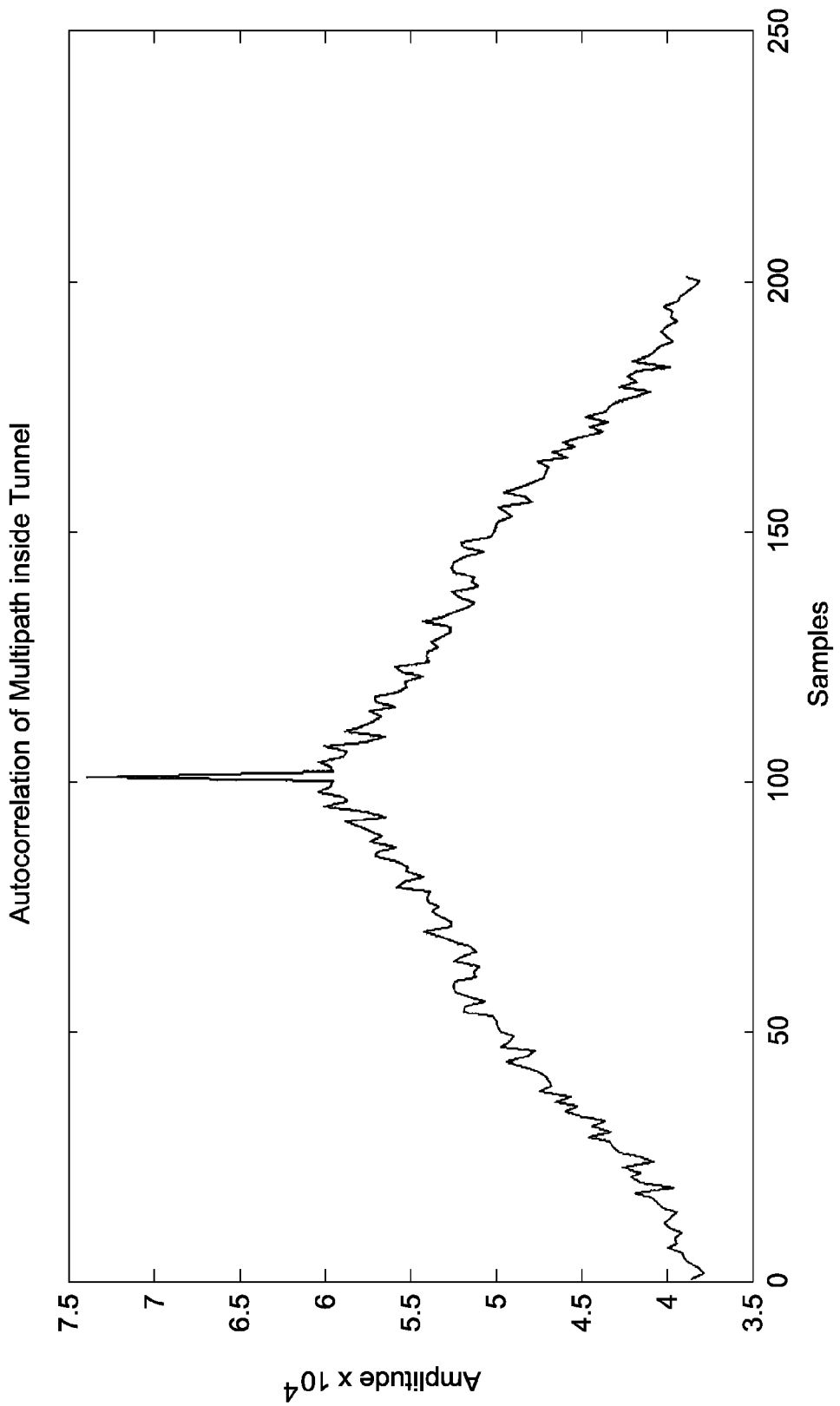
FIG. 6 is an exemplary plot of autocorrelation of multipath data empirically collected in a tunnel.

FIG. 5 is a plot of autocorrelation or cross correlation of empirically collected multipath activity data due to a false trigger scenario caused by mountains. FIG. 6 is a plot of autocorrelation or cross correlation of empirically collected multipath activity data inside a tunnel.

Autocorrelation may be defined by the following equation:

$$R(k) = \sum_{i=0}^{N-l} x(i)x(i-k)$$

where N=200, and k varies from 0 to 199.

Since the correlation is performed using the same input samples, this is termed as autocorrelation.

When FIGS. 5 and 6 are compared, it can be observed that inside the tunnel the autocorrelation R(0) and R(1) have higher values in the case where the vehicle is in a tunnel than in the case where the vehicle is not in the tunnel. A threshold value for the autocorrelation may be established and/or predetermined above which is deemed indicative of a tunnel and below which is deemed indicative of some other cause of multipath. Using the values illustrated in FIGS. 5 and 6, a threshold value of about $3.5 \times 10^4$ may be used to provide demarcation between the causes of multipath. The threshold value may be made calibratable in order to ensure that it is a value that effectively differentiates between an actual tunnel and cases which are triggered by false triggers.

In one embodiment, a tunnel is detected if there occurs a sharp drop in field strength and, after two seconds of data, the autocorrelation check is satisfied, i.e., the autocorrelation is above the threshold value. Thus, if a tunnel entry trigger is obtained, then a tunnel entry may be confirmed by using two seconds of data and checking its autocorrelation. If the autocorrelation check passes, then a tunnel entry is confirmed. When the tunnel entry is confirmed, then the driver's personalized preferences for the vehicle system settings may be retrieved from memory and implemented. Subsequently, a tunnel exit trigger could then be accepted as valid.

If a tunnel entry is detected, e.g., if there occurs a sharp drop in field strength, but the autocorrelation check fails, e.g. the autocorrelation is below the threshold value, then the tunnel entry detection may be disregarded. Even if a subsequent tunnel exit is detected, it too may be disregarded.

In order to avoid scenarios in which tunnel entries are detected back-to-back, which may result in wasted processing time in checking autocorrelation multiple times and re-implementing driver preferences, a timer may be set for five seconds to ensure that only one tunnel entry is accepted during any five second interval of time. This timer may be speed decremented and may be based on vehicle speed.

The driver's preferences for vehicle system settings while in a tunnel may be obtained in any of a variety of ways and stored in memory. For example, the driver may be prompted to enter his preferences for tunnel settings by manually actuating the associated user interfaces. In another embodiment, the driver receives no prompting. Rather, when it is detected that the vehicle has actually entered a tunnel, the vehicle system settings that the driver enters by manually actuating the associated user interfaces are recorded. These recorded settings may then later be used as the driver's preferred in-tunnel settings. In any case, a group of default in-tunnel settings that most drivers prefer may be stored and implemented until a particular driver's preferred settings may be determined and recorded.

Figure 7:
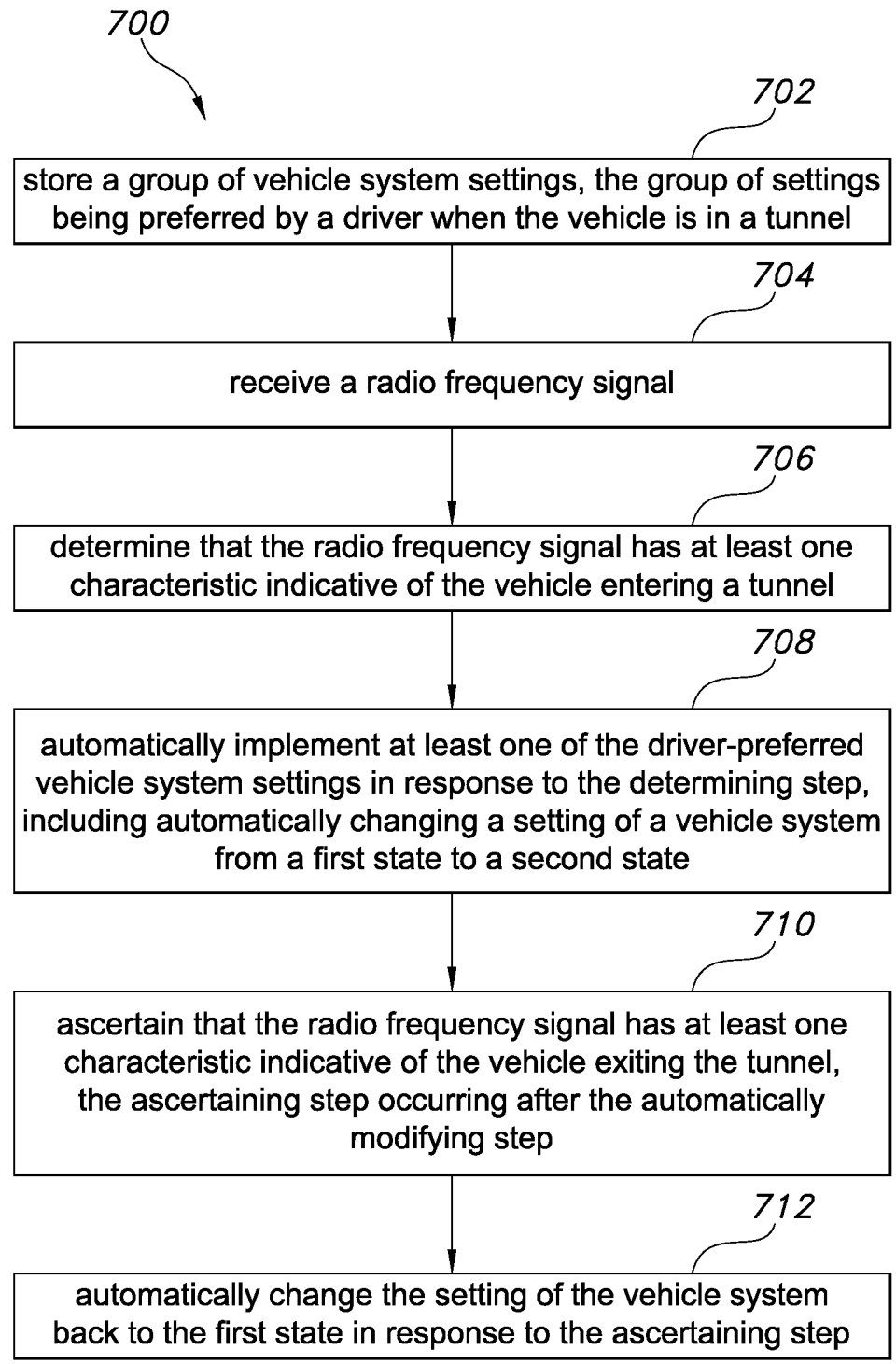
FIG. 7 is a flow chart of one embodiment of a method of the present invention for operating a vehicle.

One embodiment of a method 700 of the present invention for operating a vehicle is illustrated in FIG. 7. In a first step 702, a group of vehicle system settings are stored, the group of settings being preferred by a driver when the vehicle is in a tunnel. That is, a driver, or possibly an owner or some other person associated with a vehicle may prefer that certain vehicle system settings be implemented while the vehicle is in a tunnel. The settings may be entered into vehicle system controller 34 by human personnel in response to an audio or video prompt, or in response to the vehicle actually traveling into a tunnel. Alternatively, the settings may be default settings entered at the factory as settings that would be most likely or most often preferred. Regardless of how the settings are obtained, the settings may be stored in electronic memory of the vehicle.

Next, in step 704, a radio frequency signal is received. For example, the vehicle may include a radio that is also used for entertainment purposes. Such a radio may receive radio frequency signals that are broadcast originally from radio stations.

In a next step 706, it is determined that the radio frequency signal has at least one characteristic indicative of the vehicle entering a tunnel. In one embodiment, microcontroller 22 and/or DSP 24 may analyze samples of the radio frequency signal and may identify therein a drop in field strength that is related to high multipath activity upon entering the tunnel.

In step 708, at least one of the driver-preferred vehicle system settings is automatically implemented in response to the determining step, including automatically changing a setting of a vehicle system from a first state to a second state. That is, microcontroller 22 may inform vehicle system controller 34 that a tunnel has been entered, and, in response, controller 34 may retrieve a preferred setting from memory and automatically implement the preferred setting. That is, controller 34 may automatically change a setting of a vehicle system, such as instrument cluster illumination, HVAC, headlights, vehicle speed regulation, or power windows, from a first state that the system was in before the tunnel was detected to a second state that is preferred while in the tunnel.

Next, in step 710, it is ascertained that the radio frequency signal has at least one characteristic indicative of the vehicle exiting the tunnel. The ascertaining step occurs after the automatically modifying step. In one embodiment, after the vehicle system setting has been changed in response to the tunnel detection, microcontroller 22 and/or DSP 24 may analyze samples of the radio frequency signal and may identify therein an increase in field strength that is related to high multipath activity upon exiting the tunnel.

In a final step 712, the setting of the vehicle system is automatically changed back to the first state in response to the ascertaining step. That is, after it is ascertained that the vehicle is exiting the tunnel, the vehicle system setting may be automatically returned to the state that it was in before the tunnel entry was detected.

Although the present invention has been described herein as determining when a vehicle enters or exits a tunnel, it is to be understood that the invention may also be applied to determining when a vehicle enters or exits a tunnel-like environment, such as an underground garage.

It is to be understood that operation of the present invention as described above is not limited to instances in which the audio system is in the tuner source mode. To the contrary, the present invention as described above may be implemented while the audio system is in some non-tuner source mode, such as compact disc (CD) playback mode. When the audio system is in a non-tuner source mode such as the CD playback mode, the tuner may perform a bandscan of the FM band, for example, and tune to the strongest station, i.e., frequency, found in the frequency spectrum. The tuner may continue to stay on this strongest station and may monitor the station's field strength drop for the purpose of tunnel detection, even when the audio system is operating in a non-tuner source mode.

If, while the audio system is in a non-tuner source mode, the tuned-to signal fades, i.e., falls in strength, in a way that is not indicative of entering a tunnel (e.g., if the reduction in signal strength is very gradual over the course of many miles), then the tuner may find a new, stronger frequency to monitor. Else, the drop in signal strength upon entering a tunnel may not be sharp enough to trigger the tunnel logic. In one embodiment, a calibratable loss-handling timer (not shown) times out in response to the currently tuned-to frequency falling, in a gradual way, below a threshold signal strength (e.g., 20 dBμV) for more than a predetermined length of time. In response to the timing out of the loss-handling timer, the tuner may again perform a bandscan and lock into a new, stronger frequency. Thus, even when the audio system is in a non-tuner source mode, the tuner may always be locked on to a strong FM station in the background to trigger the tunnel detection logic.

In a particular embodiment, the loss-handling timer described above checks the signal quality regularly (e.g., every ten seconds). In each signal quality check, three signal quality samples are taken 200 milliseconds apart. If the signal strength is below a threshold value in each of the three samples, then a bandscan may be performed in order to find a frequency with a stronger signal strength to monitor.

The above described signal quality check may not be performed while the audio system is in tuner mode. That is, the algorithm may assume that when the audio system is in the tuner mode the user/listener will take action to ensure that the tuner is tuned to a valid listenable station that has a strong received signal and that is not noisy.

The present invention has been described herein as being applied to a single tuner audio system. However, it is to be understood that the present invention may be implemented in either a dual tuner environment or a single tuner environment. In a dual tuner system, one of the tuners can be dedicated for background scanning.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a vehicle, comprising the steps of:
   receiving a radio frequency signal;
   performing an autocorrelation operation dependent upon the radio frequency signal;
   determining that the radio frequency signal has at least one characteristic indicative of the vehicle entering a tunnel, the determining step being dependent upon a result of the autocorrelation operation; and
   automatically modifying a vehicle system in response to the determining step.

2. The method of claim 1 wherein the modifying includes modifying a setting of the vehicle system, and includes at least one of increasing illumination of an instrument cluster, inhibiting outside air from entering a passenger compartment, turning on headlights, regulating vehicle speed, and closing a window.

3. The method of claim 1 wherein the at least one characteristic indicative of the vehicle entering a tunnel comprises a decrease in field strength related to high multipath activity.

4. The method of claim 1 comprising the further step of storing a group of vehicle system settings, the group of settings being preferred by a person associated with the vehicle when the vehicle is in a tunnel, the automatically modifying step including implementing at least one of the preferred settings.

5. The method of claim 1 comprising the further steps of:
   ascertaining that the radio frequency signal has at least one characteristic indicative of the vehicle exiting the tunnel, the ascertaining step occurring after the automatically modifying step; and
   automatically re-modifying the vehicle system in response to the ascertaining step, wherein the automatically re-modifying step includes changing a setting of the vehicle system back to a state that the setting was in before the determining step.

6. The method of claim 1 wherein the autocorrelation operation is performed on data from the radio frequency signal.

7. The method of claim 1 wherein the determining step comprises confirming that the radio frequency signal has an autocorrelation value that is greater than a threshold value.

8. A method of operating a vehicle, comprising the steps of:
   storing a group of vehicle system settings, the group of settings being preferred when the vehicle is in a tunnel;
   determining that a radio frequency signal has at least one characteristic that is indicative of the vehicle entering a tunnel; and
   automatically implementing at least one of the preferred vehicle system settings in response to the determining step.

9. The method of claim 8 wherein the automatically implementing step includes at least one of increasing illumination of an instrument cluster, inhibiting outside air from entering a passenger compartment, turning on headlights, regulating vehicle speed, and closing a window.

10. The method of claim 8 wherein the at least one characteristic indicative of the vehicle entering a tunnel comprises a decrease in field strength related to high multipath activity.

11. The method of claim 8 wherein the group of vehicle system settings is preferred by a person associated with the vehicle.

12. The method of claim 8 comprising the further step of preventing the determining step from occurring more than once during any time period having a duration less than a predetermined duration.

13. The method of claim 8 comprising the further steps of:
ascertaining that the radio frequency signal has at least one characteristic indicative of the vehicle exiting the tunnel, the ascertaining step occurring after the automatically implementing step; and
automatically changing the setting of the vehicle system back to a state that the setting was in before the determining step.

14. The method of claim 8 wherein the radio frequency signal is received in the vehicle, the determining step additionally comprising confirming that the radio frequency signal has an autocorrelation value that is greater than a threshold value.

15. A method of operating a vehicle, comprising the steps of:
receiving a broadcast radio frequency signal;
determining that the broadcast radio frequency signal has at least one first characteristic indicative of the vehicle entering a tunnel;
automatically changing a setting of a vehicle system from a first state to a second state in response to the determining step;
ascertaining that the broadcast radio frequency signal has at least one characteristic indicative of the vehicle exiting the tunnel, the ascertaining step occurring after the automatically modifying step; and
automatically changing the setting of the vehicle system back to the first state in response to the ascertaining step.

16. The method of claim 15 wherein the first automatically changing step includes at least one of increasing illumination of an instrument duster, inhibiting outside air from entering a passenger compartment, turning on headlights, regulating vehicle speed, and closing a window.

17. The method of claim 15 wherein the at least one characteristic indicative of the vehicle entering a tunnel comprises a decrease in field strength related to high multipath activity and/or an autocorrelation value that is greater than a threshold value.

18. The method of claim 15 comprising the further step of storing a group of vehicle system settings, the group of settings being preferred by a person associated with the vehicle when the vehicle is in a tunnel, the first automatically changing step including implementing at least one of the preferred settings.

19. The method of claim 15 wherein the determining step comprises confirming that the radio frequency signal has an autocorrelation value that is greater than a threshold value.

20. The method of claim 15 wherein the at least one characteristic indicative of the vehicle exiting the tunnel comprises an increase in field strength related to high multipath activity.

* * * * *